(12) United States Patent
Scaggs (10) Patent No.: US 9,024,232 B1
(45) Date of Patent: May 5, 2015

(54) APPARATUS FOR SCRIBING THIN FILMS IN PHOTOVOLTAIC CELLS

(71) Applicant: Vinyl Technologies, Inc., Fitchburg, MA (US)

(72) Inventor: Michael J. Scaggs, Weston, FL (US)

(73) Assignee: Vinyl Technologies, Inc., Fitchburg, MA (US)

( * ) Notice: Subject to any disclaimer, the term of this patent is extended or adjusted under 35 U.S.C. 154(b) by 0 days.

(21) Appl. No.: 14/147,986

(22) Filed: Jan. 6, 2014

Related U.S. Application Data (62) Division of application No. 12/464,538, filed on May 12, 2009, now Pat. No. 8,624,155.

(51) Int. Cl.
  *B23K 26/00* (2014.01)
  *B23K 26/36* (2014.01)
  *G02B 27/09* (2006.01)

(52) U.S. Cl.
  CPC .......... *B23K 26/367* (2013.01); *G02B 27/0927* (2013.01)

(58) Field of Classification Search
  CPC ............. B23K 26/0656; B23K 26/365; B23K 26/0652; B23K 26/367; B23K 26/0823
  USPC ............. 219/121.25, 121.67, 121.68, 121.79, 219/121.83; 359/333, 349, 566, 569, 626, 359/691, 692, 719
  See application file for complete search history.

(56) References Cited

U.S. PATENT DOCUMENTS

| | | | |
|---|---|---|---|
| 3,793,518 A * | 2/1974 | Harper | 250/347 |
| 4,734,550 A * | 3/1988 | Imamura et al. | 219/121.77 |
| 5,798,877 A | 8/1998 | Nightingale et al. | |
| 6,295,168 B1 | 9/2001 | Hoffnagle et al. | |
| 6,420,678 B1 * | 7/2002 | Hoekstra | 219/121.75 |
| 6,621,639 B2 | 9/2003 | Kahlert et al. | |
| 6,697,181 B2 | 2/2004 | Masuda | |
| 6,975,458 B1 | 12/2005 | Kanzler | |
| 2004/0179560 A1* | 9/2004 | Das et al. | 372/25 |
| 2007/0062919 A1* | 3/2007 | Hamada et al. | 219/121.71 |

* cited by examiner

*Primary Examiner* — Thien S Tran
(74) *Attorney, Agent, or Firm* — Ronald E. Smith; Smith & Hopen, P.A.

(57) ABSTRACT

A thin-film scribing apparatus employing an optical device converts a low M2, Gaussian or pseudo-Gaussian beam into an inverted Gaussian beam. The all refractive optical device is such that it is not susceptible to either beam size or angular variations and exhibits very little loss of energy for the transformation process. The output can be configured for either single or dual-axis operation where the geometric shape of the beam is rectangular or square with steep edge intensity. The resulting rectangular beam requires less beam overlap and has very little shoulder in the intensity profile, providing high uniformity scribe features with greatly improved processing speeds.

1 Claim, 14 Drawing Sheets

APPARATUS FOR SCRIBING THIN FILMS IN PHOTOVOLTAIC CELLS

BACKGROUND OF THE INVENTION

1. Field of the Invention

This invention relates, generally, to optics. More particularly, it relates to scribing thin films in photovoltaic cells.

2. Description of the Prior Art

Conventional scribing of thin films used in solar cells uses focused Gaussian or Gaussian-like laser beams. A round Gaussian laser beam is passed through a focusing lens. Typically, a singlet, best form lens, or a doublet is used, depending upon how tightly the user wants to focus. The price of the optic increases with increasing complexity of the focusing objective.

The substrate to be scribed is placed at the focus of the lens. Thin films ablate from the substrate after the intensity of the focused laser beam reaches a particular threshold. The laser energy absorbed prior to ablation threshold goes into the material as heat, causing thermal damage to the thin film and surrounding area.

Moreover, laser beams are predominately round. Accordingly, a large overlap of consecutive spots is required to minimize scalloping at the edge of the scribe line. This large overlaps slows down the scribing process considerably.

The homogenization of a laser beam can correct the non-steep side profile of a Gaussian distribution. However, homogenization is difficult to implement for scribing applications because the optics used in such scribing systems tend to be flying optics; this precludes using imaging-based homogenized laser beams.

A free form phase shifting optical device can produce a top hat profile that would otherwise be desirable. However, such devices cannot tolerate variation to the input laser beam or beam misalignment. Accordingly, they have not found much use in production systems.

Focused laser beams that are predominately Gaussian or Gaussian-like in shape are not ideal where a steep energy transition is needed to cleanly remove a thin film.

A free form phase shifting optical device such as disclosed in U.S. Pat. No. 6,295,168 transforms a Gaussian laser beam into a top-hat homogenized field but is difficult to implement in production due to the stringent requirements of an extremely stable laser beam and its alignment into the optical system.

A laser beam homogenizer such as disclosed in U.S. Pat. No. 6,621,639 inverts a small section of a Gaussian-like beam for better homogeneity after it passes through a lens array homogenizer. This approach is an imaged based solution limited to lasers with low spatial coherence and does not lend itself to systems that require a flying optics head.

U.S. Pat. No. 6,975,458 discloses an off-axis grating that transforms a Gaussian distribution to create a specific shape in the far field. This approach requires expensive optics and does not have high diffraction efficiency. Moreover, it is usually implemented as an imaging based system which is not suitable for flying head optics.

U.S. Pat. No. 6,697,181 discloses an apparatus that creates an inverted Gaussian shape at a scan focus using special transmission plates and a pyramid type prism. It is not a collimated solution and is therefore not practical for a scribing system.

U.S. Pat. No. 5,798,877 discloses rectangular prisms that break up and reposition a laser beam into two components in an effort to improve the symmetry of a diode array. Several complex prisms are used to accomplish the task.

An inexpensive but effective method for scribing a square spot instead of a conventional round spot is needed. This would eliminate the need for a large overlap of consecutive round spots and would eliminate the scalloping at the edge of the scribe line. It would also speed up the scribing process considerably.

However, in view of the prior art taken as a whole at the time the present invention was made, it was not obvious to those of ordinary skill how the identified need could be fulfilled.

SUMMARY OF THE INVENTION

The long-standing but heretofore unfulfilled need for an apparatus that improves the scribing process by reducing the need for large overlapping of consecutive spots as required by the prior art to minimize scalloping at the edge of the scribe line is now met by a new, useful, and non-obvious invention.

The novel apparatus is an all refractive optical device that transforms a Gaussian laser beam, a pseudo-Gaussian laser beam, or a low M2 laser beam into an inverted Gaussian laser beam. The novel optical device is substantially not susceptible to beam size or angular variations. It exhibits insubstantial loss of energy during the transformation of the Gaussian laser beam, pseudo-Gaussian laser beam, or low M2 laser beam into the inverted Gaussian laser beam.

The novel optical device has an output configured for single-axis operation where the geometric shape of the laser beam is rectangular with steep edge intensity. It also has an output configured for single-axis operation where the geometric shape of the beam is square with steep edge intensity.

The novel optical device has an output configured for dual-axis operation where the geometric shape of the beam is rectangular with steep edge intensity. It also has an output configured for dual-axis operation where the geometric shape of the beam is square with steep edge intensity.

A resulting rectangular beam requires less beam overlap and has very little shoulder in the intensity profile. High uniformity scribe features are produced and processing speeds are improved.

A first embodiment of the novel thin-film scribing apparatus includes a telescope including an array of four (4) spherical lenses. Each of the four (4) spherical lenses are cut as square elements and placed in abutting relation to form a square array. The telescope has a 1× magnification so that an outer dimension of the beam is not altered.

In a second embodiment, a first glass cube is rotated forty five degrees (45°) on an X axis where an optical axis of laser light propagates along a Z axis so that said first cube of glass inverts a laser beam in one axis and so that the laser beam inverted in one axis is sufficient for scribing in one axis of a solar panel.

In a variation of the second embodiment, a first glass cube is rotated forty five degrees (45°) on a Y axis where an optical axis of laser light propagates along a Z axis.

In a third embodiment, a second glass cube is in alignment with the first glass cube. The second glass tube is rotated forty five degrees (45°) from the opposing axis of the first glass tube to invert the laser beam in both axes.

In a fourth embodiment, an octahedron optical element is adapted to invert both axes of a Gaussian beam. The octahedron optical element includes a polygon refractor having a plurality of flat surfaces. Each flat surface of the polygon refractor is coated with an anti-reflection coating to minimize surface reflection losses for a laser wavelength used for scribing.

A fifth embodiment includes a first pair of dove prisms having silvered bases disposed in base-to-base abutting relation to one another. In a variation of the fifth embodiment, a second pair of dove prisms is disposed in base-to-base abutting relation to the first pair of dove prisms. The first pair of dove prisms is rotated ninety degrees (90°) with respect to the second pair of dove prisms. The first and second pairs of dove prisms are equivalent to two cubes placed in base-to-base abutting relation to one another where a first cube is rotated ninety degrees (90°) with respect to a second cube.

All embodiments include a thin film substrate, a laser adapted to provide a laser beam, a refractive optics with suitable antireflection coating to minimize reflection losses positioned in a path of the laser beam so that a center of the laser beam passes through a center of the refractive optics, and a focusing means positioned between said refractive optics and the thin film substrate to focus the laser beam onto the thin film.

The refractive optics may take the form of a 4×4 element Keplerian telescope, a single glass cube, dual cubes, an octahedron, or dual dove prism combinations.

The inventive structure produces a square profile with a very sharp intensity slope at the edge of the profile. The square profile is collimated so that it can be focused by a focusing object that can be placed anywhere beyond the prism assembly.

An important object of the invention is to increase the intensity of a laser beam on the outside of the focused laser spot regardless of where the focus optics are positioned in the system.

Another important object is to create a rectangular focused spot area without special imaging.

Still another object is to produce a laser scribe that is free of scalloping or lifting at the edges.

These and other important objects, advantages, and features of the invention will become clear as this disclosure proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1A:
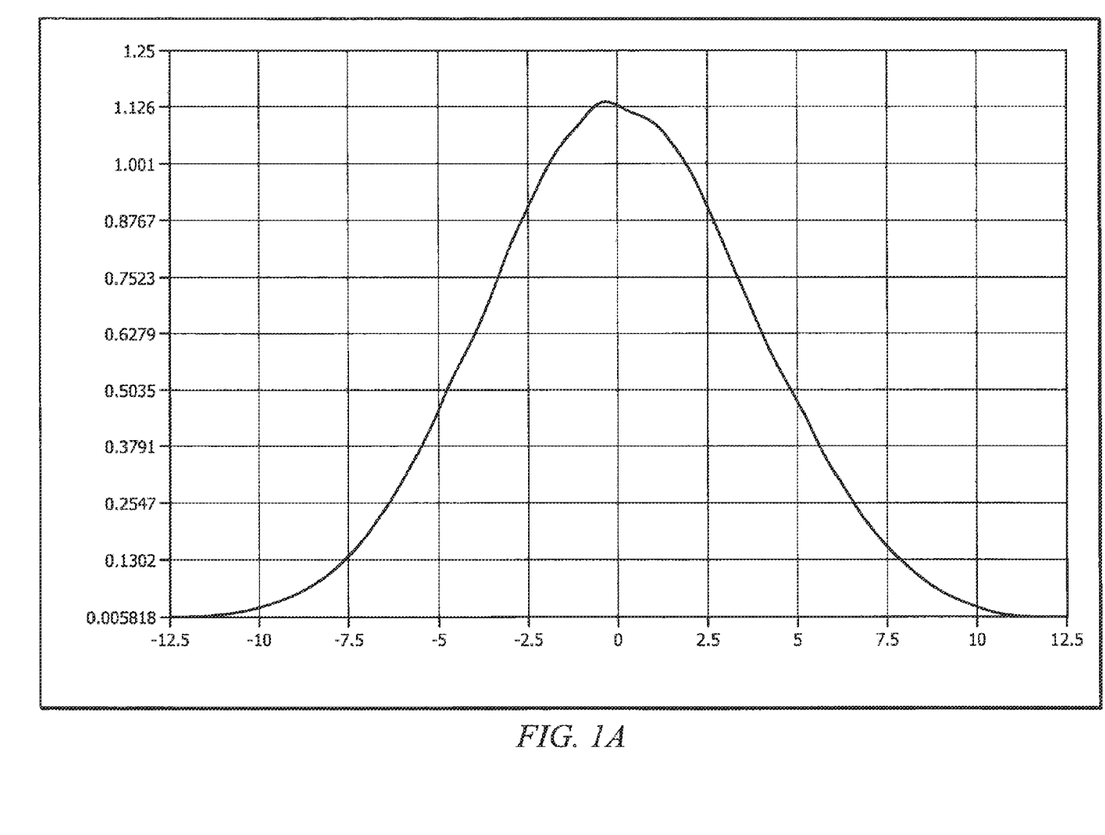
FIG. 1A is a graph depicting the intensity of a Gaussian laser beam in watts per square centimeters as a function of distance in millimeters from the center of the beam.

FIG. 1A graphically plots an arbitrary intensity in watts per square centimeter of a Gaussian or Gaussian-like laser beam on a Y-axis against the distance in millimeters from the center of the beam on an X-axis.

Figure 1B:
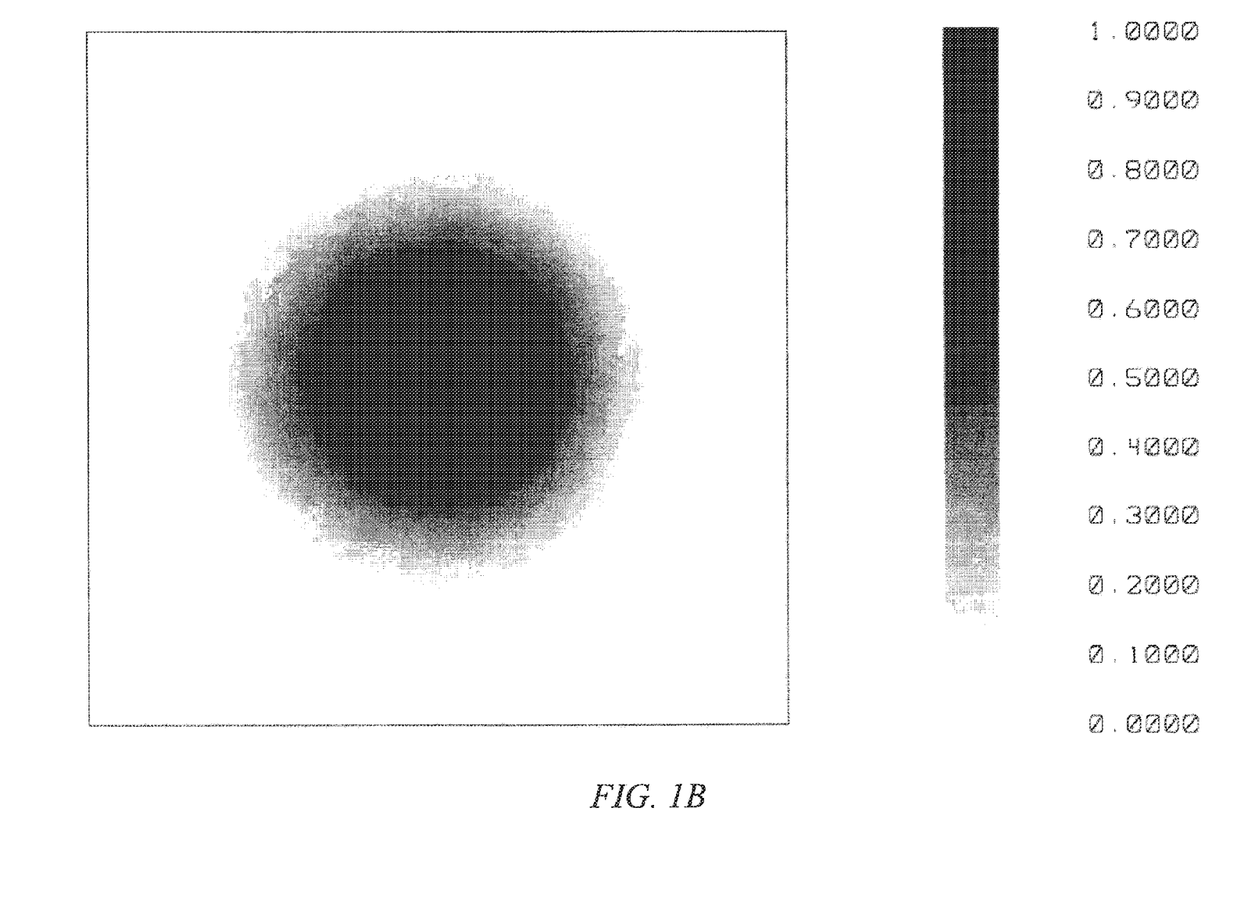
FIG. 1B is a grey scale, cross-sectional view, intensity profile of the Gaussian laser beam of FIG. 1A.

FIG. 1B depicts such a beam in a cross-sectional view. As indicated in the graph and the drawing, the intensity of the beam is highest at its center and decreases as radial distance from said center increases until the lowest density is at the peripheral edge of the beam.

Figure 1C:
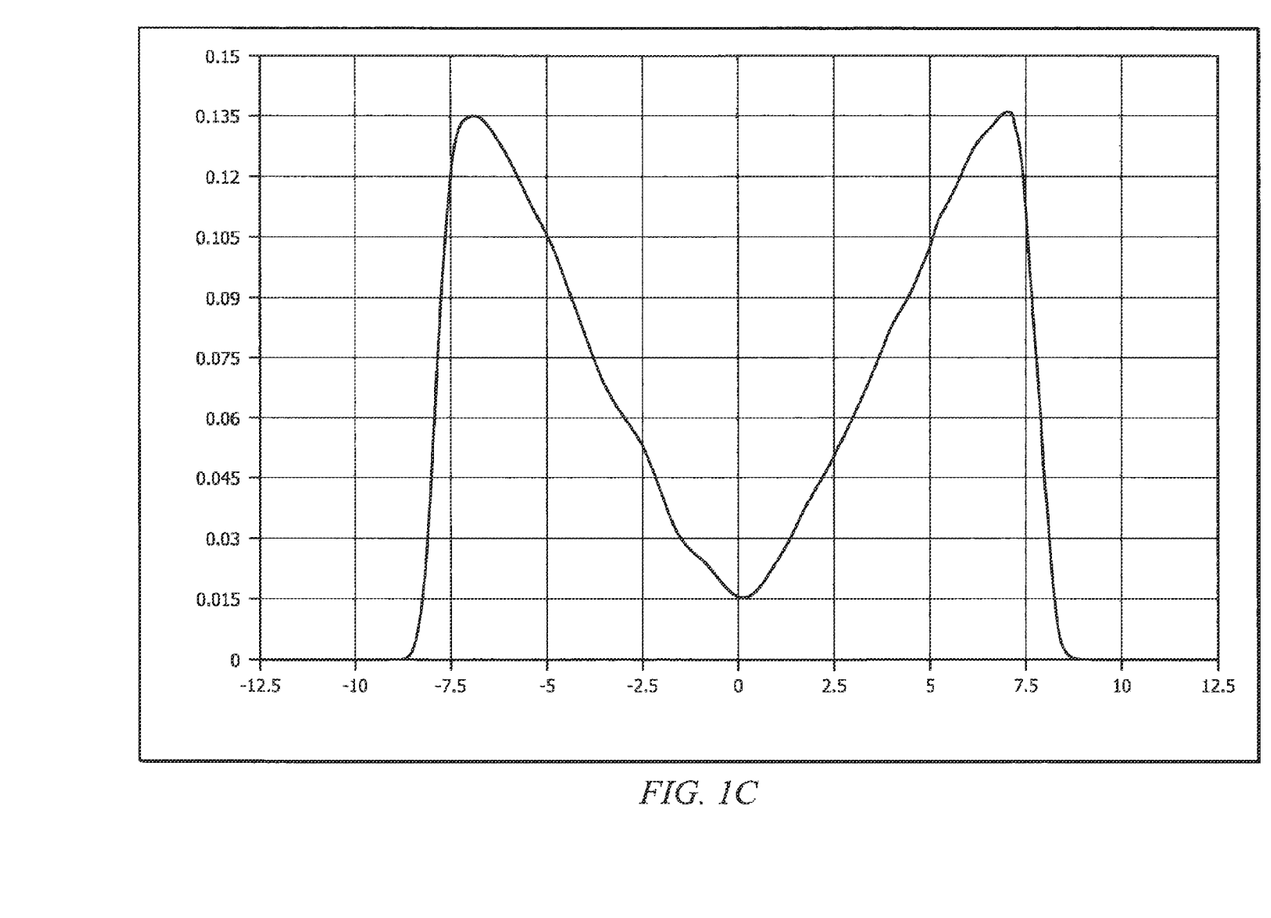
FIG. 1C is a graph having the same parameters as the graph of FIG. 1A but depicting the intensity of a Gaussian laser beam that has been transformed by the all-refractive optics of this invention.

FIG. 1C graphically plots the intensity in watts per square centimeter of a Gaussian or Gaussian-like laser beam on a Y-axis against the distance in millimeters from the center of the beam on an X-axis after said beam is transformed by a Gaussian inverter.

Figure 1D:
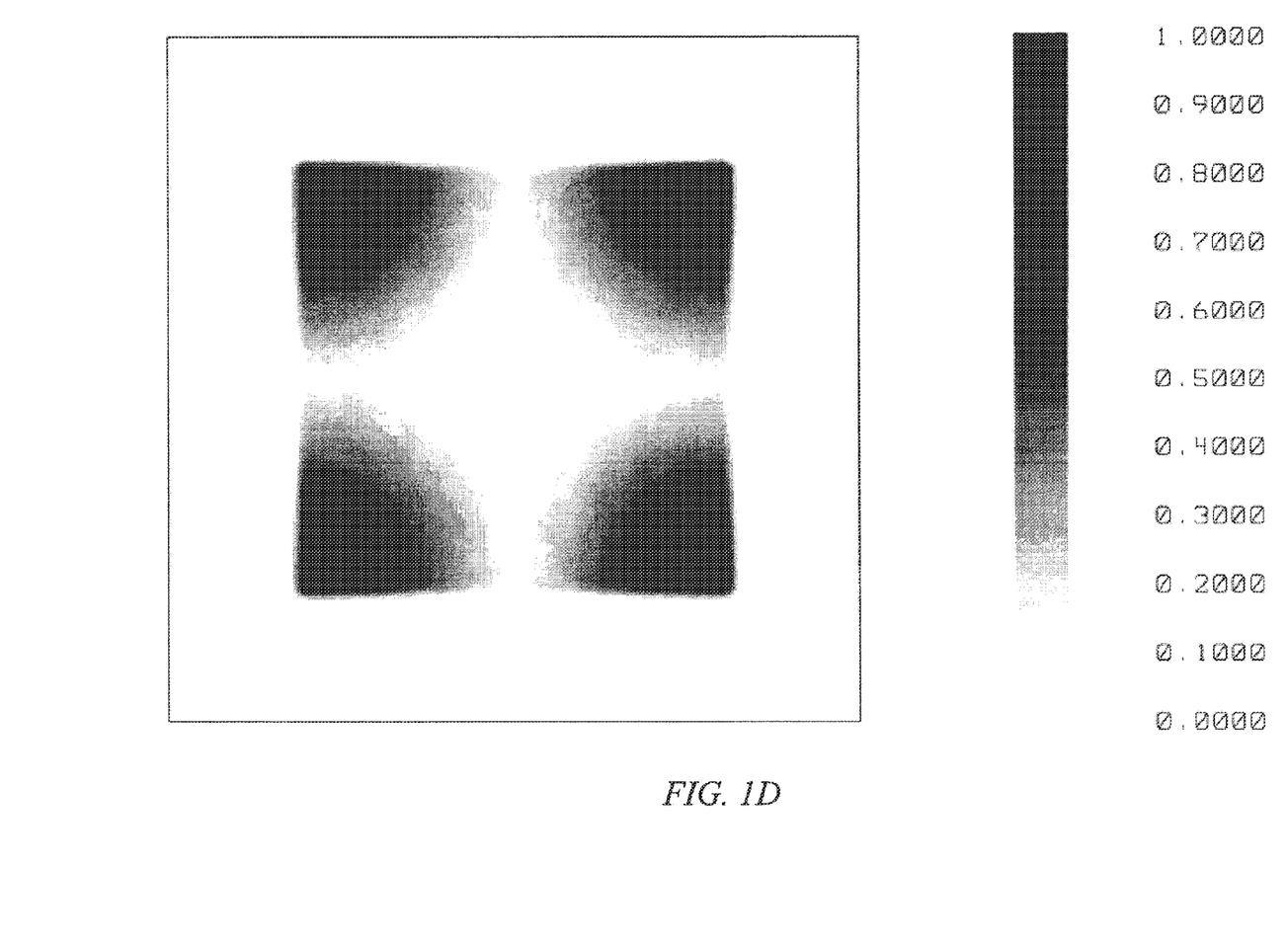
FIG. 1D is a grey scale, cross-sectional view, intensity profile of the Gaussian laser beam of FIG. 1C.

FIG. 1D depicts the beam in a cross-sectional view after such transformation.

A Gaussian inverter is a refractive optic that transforms a Gaussian or Gaussian-like laser beam into an inverted Gaussian shape so that the high intensity at the peak of the Gaussian beam is moved to the outside and the low intensity side lobes are moved into the center of the beam.

Figure 2A:
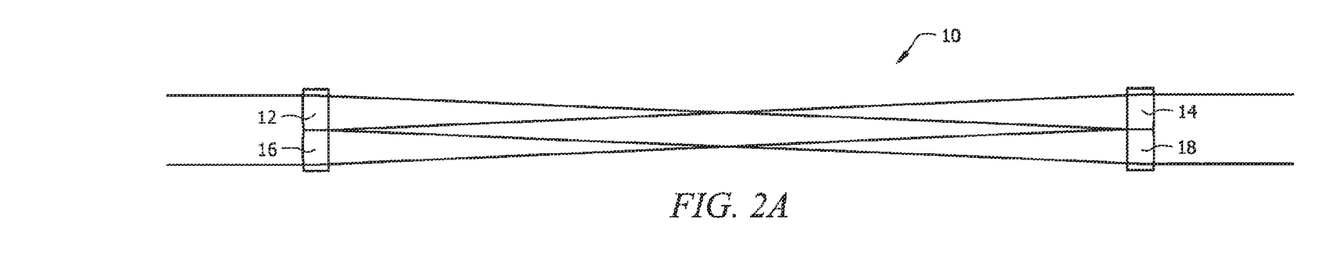
FIG. 2A is a side elevational view of a first embodiment of the novel optics.
Figure 2B:
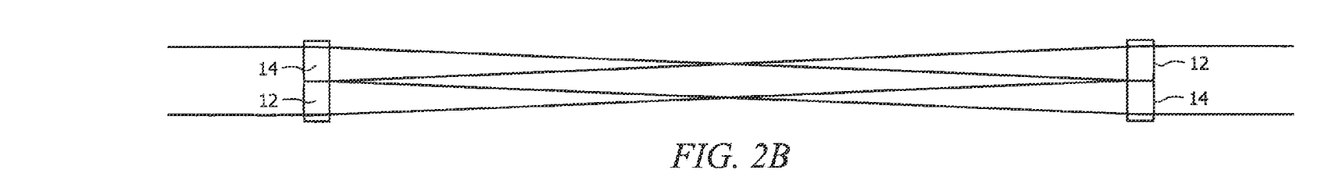
FIG. 2B is a top plan view of the first embodiment.
Figure 2C:
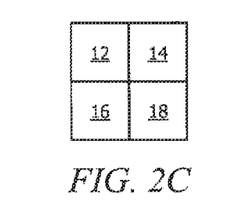
FIG. 2C is an end view of the first embodiment.

This is accomplished in a first embodiment of the invention by making a special telescope 10 that includes an array of four (4) spherical lenses as depicted in FIGS. 2A, 2B, and 2C. The spherical lenses, denoted 12, 14, 16, 18, are cut as square elements and placed side by side. The telescope is a Keplerian type with 1× magnification so as not to alter the outer dimension of the beam.

FIG. 2A depicts the telescope in side elevation, FIG. 2B provides a top plan view, and FIG. 2C is an end view thereof. Although the 4×4 Keplerian telescope would in theory produce the desired inverted Gaussian beam, it is difficult to manufacture the lenses with enough accuracy to avoid aberrations and asymmetry in the inverted Gaussian profile. The lenses add power to the beam and alignment for collimation is paramount for good functionality.

Figure 3A:
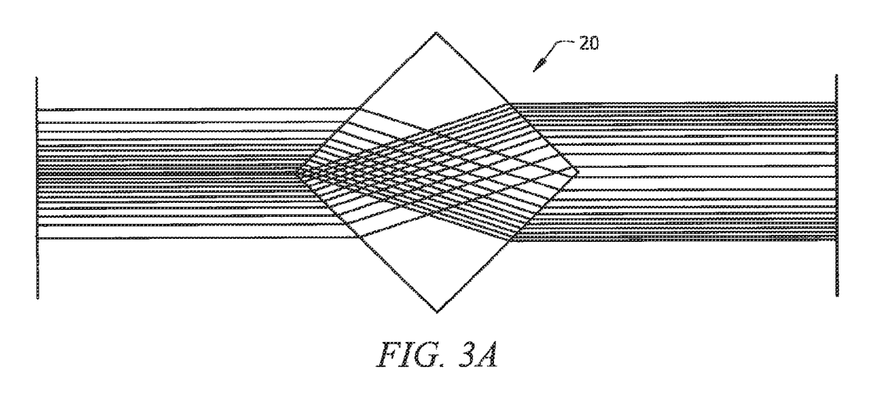
FIG. 3A is a side elevational view of a glass cube embodiment.
Figure 3B:
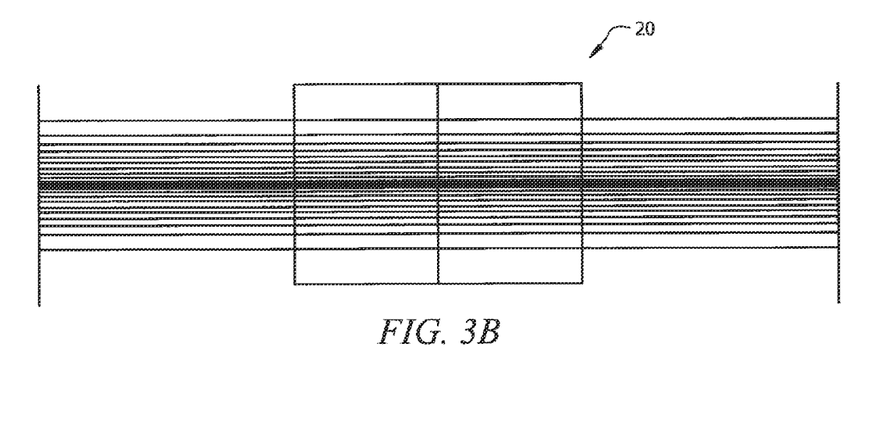
FIG. 3B is a top plan view of the structure depicted in FIG. 3A.
Figure 3C:
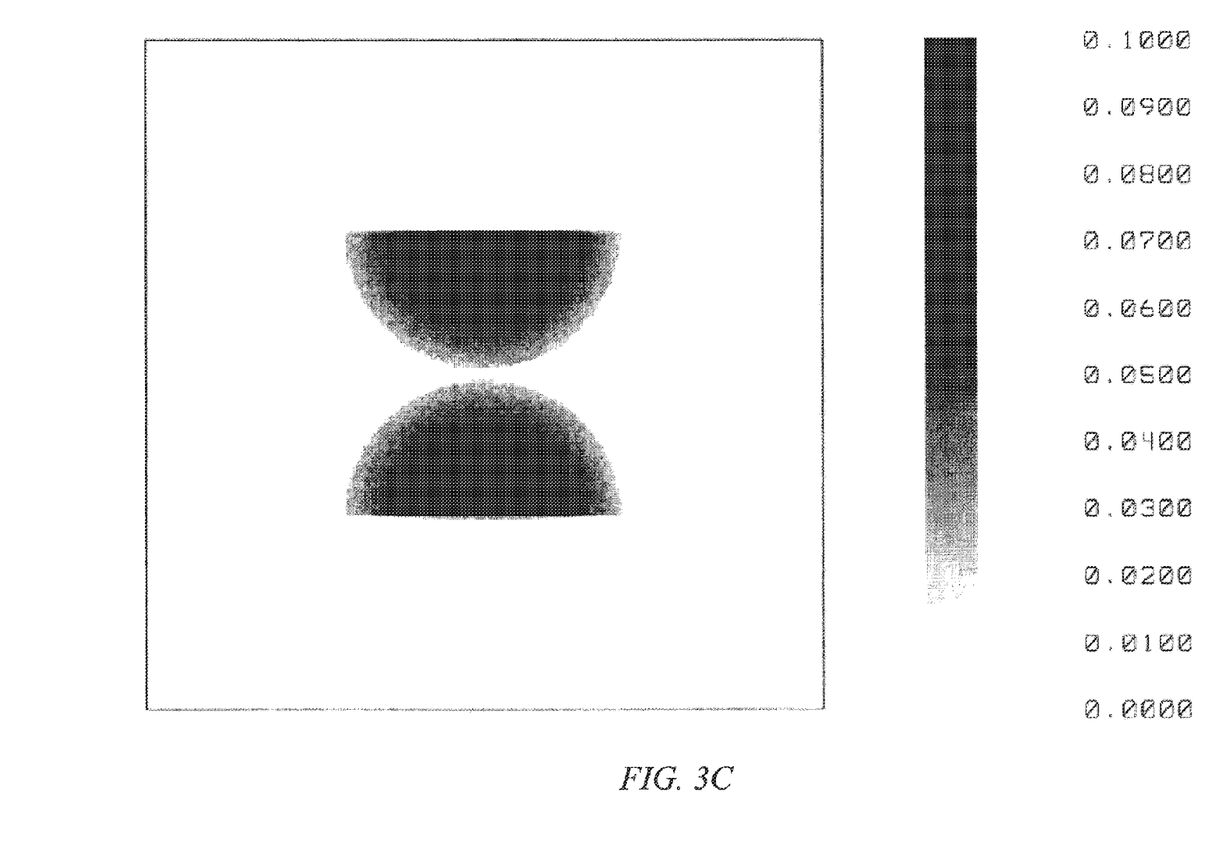
FIG. 3C is a grey scale, cross-sectional view, intensity profile of a Gaussian beam that has passed through the glass cube of FIGS. 3A and 3B.

FIGS. 3A and 3B depict a second embodiment in side and top plan elevation, respectively, where a cube of glass 20 is rotated forty five degrees (45°) on either an X axis or Y axis, assuming the optical axis of the laser light propagates along the Z axis. A single cube of glass inverts the laser beam in one axis and this alone is sufficient for scribing in one axis of a solar panel with good results. FIG. 3C depicts the beam pattern, as a cross-sectional view grey scale intensity profile, produced by this apparatus.

Figure 4A:
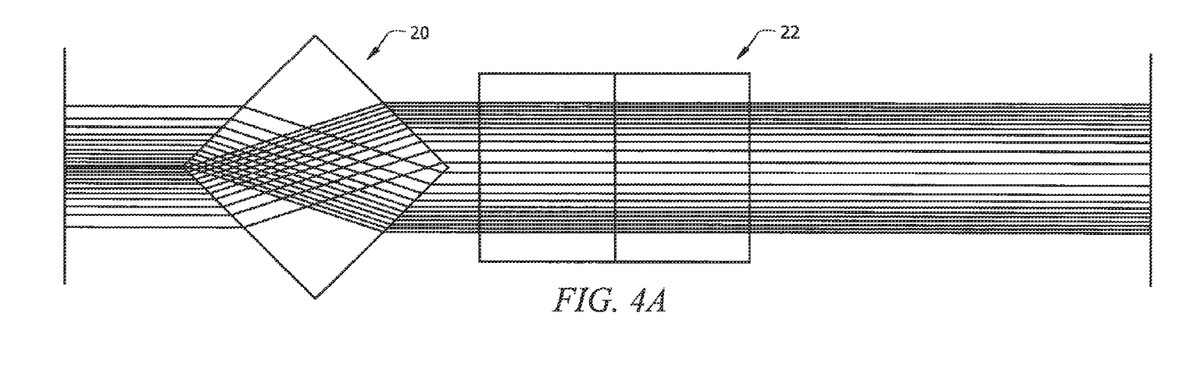
FIG. 4A is a side elevational view of a third embodiment.
Figure 4B:
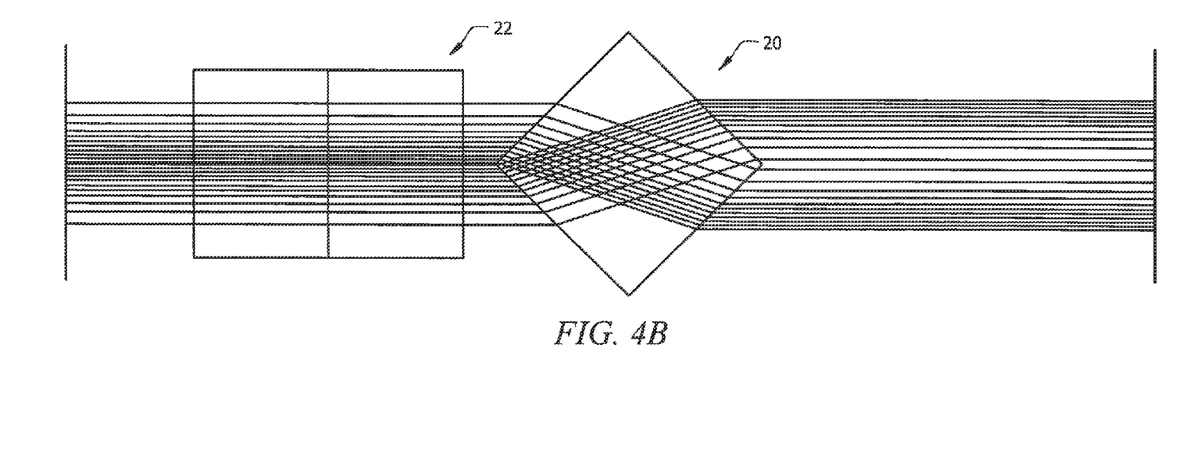
FIG. 4B is a top plan view of the third embodiment.
Figure 4C:
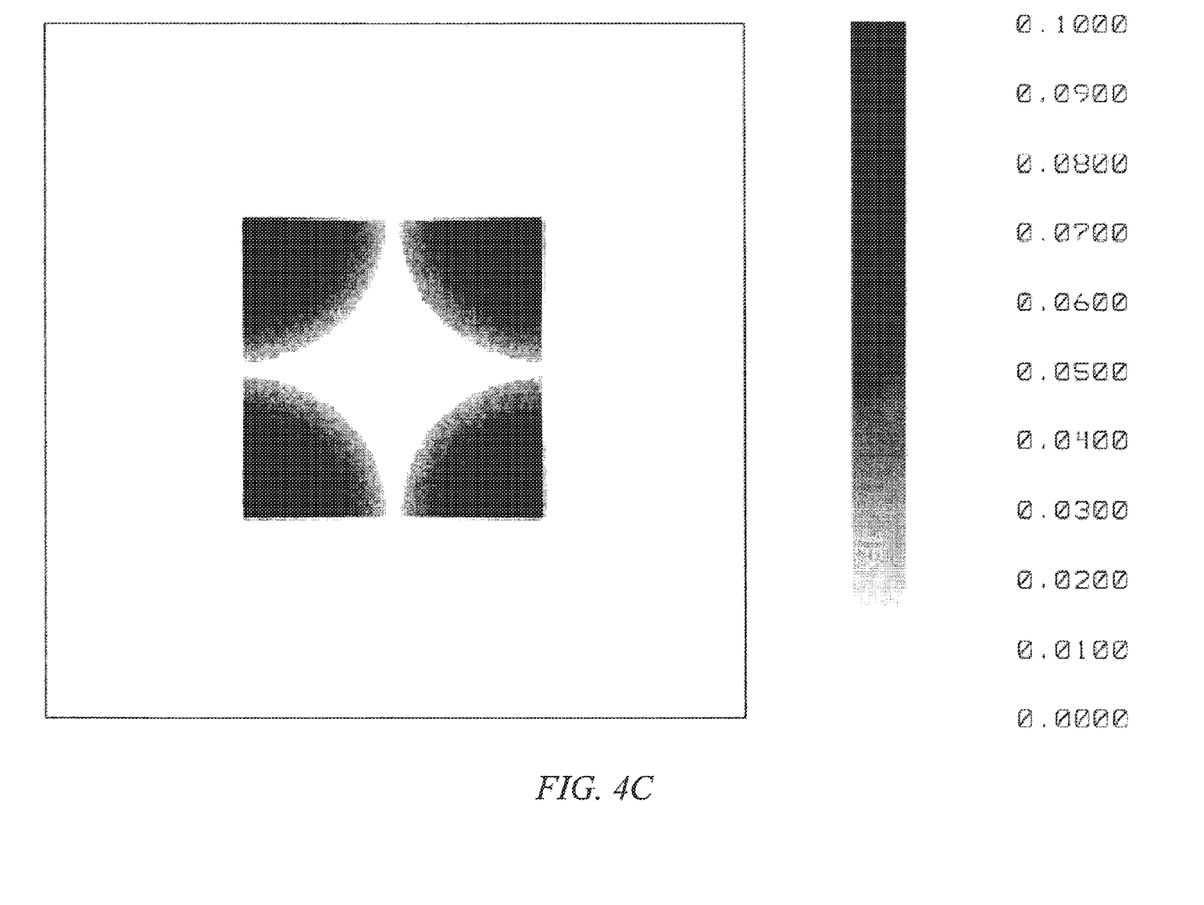
FIG. 4C is a grey scale, cross-sectional view, intensity profile of a Gaussian beam that has passed through the apparatus of FIGS. 4A and 4B.

FIGS. 4A and 4B depict a third embodiment in side and top plan elevation, respectively, where a second cube of glass 22 is added and equally rotated forty five degrees (45°) about the X axis of the first rotated prism 10 and then further rotated ninety (90°) about the Z (optical) axis to invert in both axes. The beam pattern produced by this apparatus is depicted in FIG. 4C.

Figure 5A:
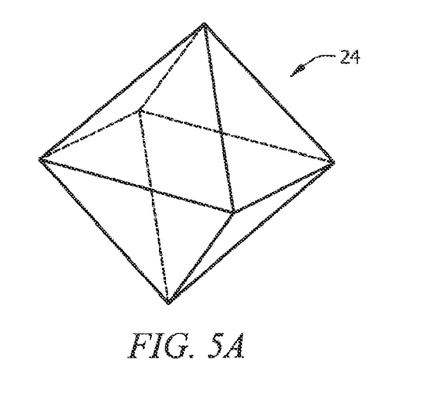
FIG. 5A is a perspective view of a octahedron optical element formed by two pyramidal optical elements disposed in base-to-base abutting relation to one another.
Figure 5B:
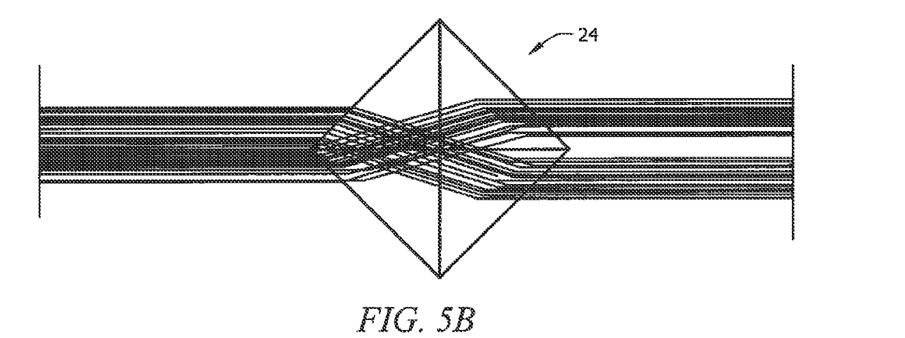
FIG. 5B is a side elevational view of said octahedron optical element.

The preferred embodiment is a single piece of glass such as an octahedron optical element 24 depicted in FIG. 5A that inverts both axes of the Gaussian beam as depicted in FIG. 5B. Each surface of the polygon refractor is coated to minimize surface reflection losses with a suitable anti-reflection coating for the laser wavelength being used for scribing. Each octahedron has eight inclined, triangular sides.

The grey scale intensity profile of the apparatus depicted in FIGS. 5A and 5B is depicted in FIG. 1D.

Figure 6:
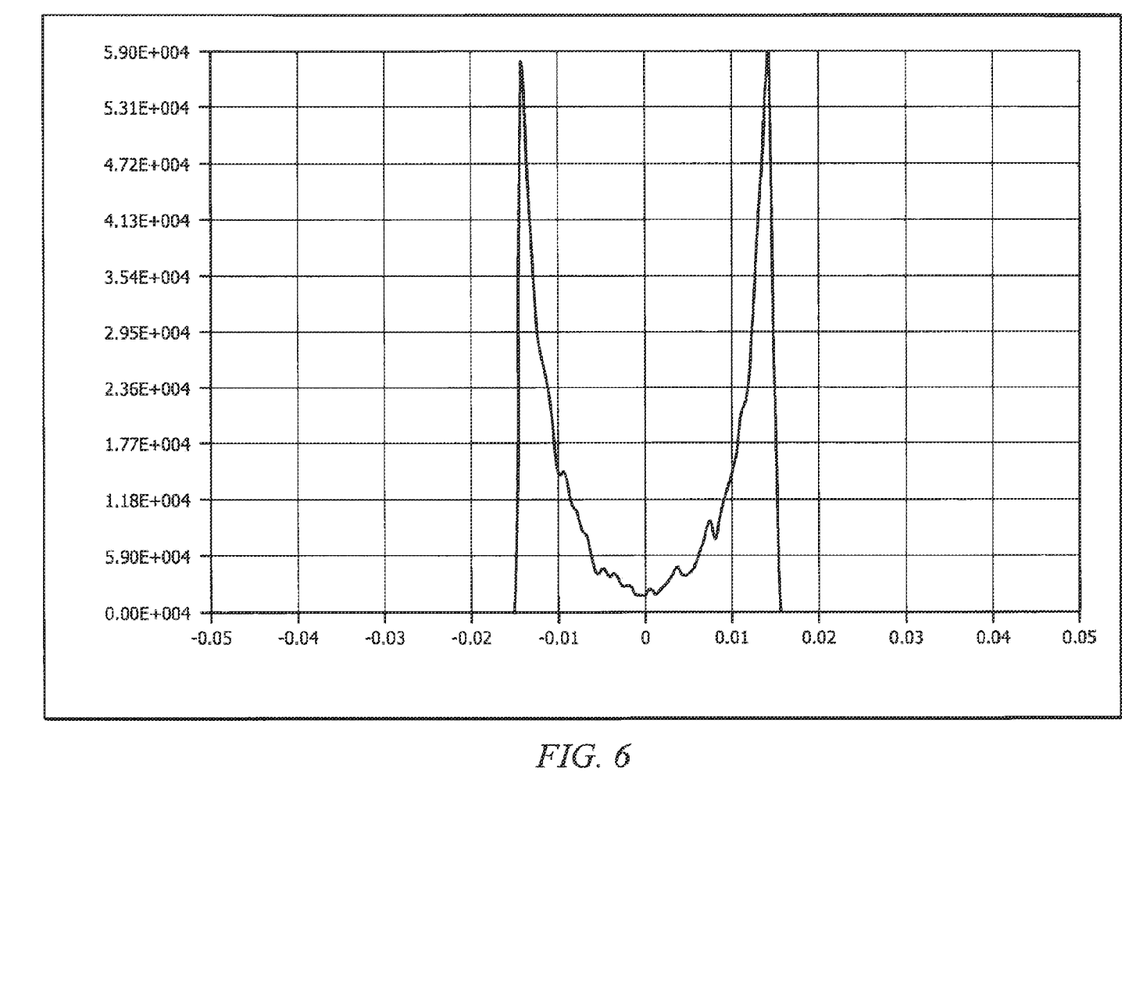
FIG. 6 is a graph depicting the intensity of a Gaussian laser beam in watts per square centimeters as a function of distance in millimeters from the center of the beam that has been transformed by said octahedron optical element at the focus of a positive lens.

FIG. 6 graphically depicts a cross sectional intensity profile of a focused spot of light passed through a octahedron Gaussian Inverter and focused with a f=100 mm plano-convex lens. This focused spot is nominally 30 microns wide and is typical for a thin film scribe. The intensity of the spot is high and steep at the edge and much lower than the center which corresponds to the basic shape of the inverted Gaussian beam. In scribing thin films the steep and high intensity edge of the spot easily and cleanly ablates. The center of the spot, although generally below ablation threshold, still gets removed through lifting of the material from the adjacent high intensity edges of the beam. In addition, there are shock wave forces from the ablation, thereby further adding the lifting of the central region. Since the refractive prism approach has no optical power, the inverted beam is very focusable and does not contribute wave front aberrations that would be transferred to the focusing lens. It is, however, important that the facets of the cube or octahedron glass have good orthogonality and parallelism. It is not difficult to achieve parallelism and orthogonality of better than ten (10) arc seconds. A ten (10) arc second wedge in a glass plate having an index of refraction of 1.5 would cause a three (3) micron displacement of the focal spot with a one hundred millimeter (100 mm) focal length lens. A typical focal spot of a laser beam for scribing is greater than thirty (30) microns and therefore such a shift would have no adverse consequence to the laser scribe.

Figure 7:
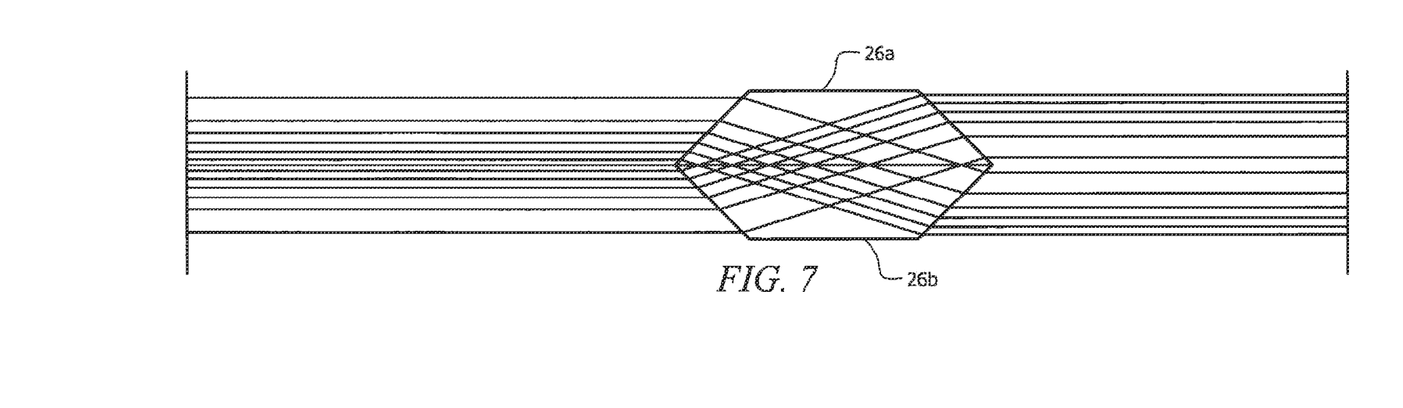
FIG. 7 is a side elevational view of an optical element formed by two dove prisms disposed in base-to-base relation to one another.

A pair of dove prisms 26a, 26b, depicted in FIG. 7, with silvered bases placed base-to-base could achieve the same result as a single cube. There is no real advantage to manufacture such an arrangement because a single cube is much more efficient to fabricate.

Figure 9A:
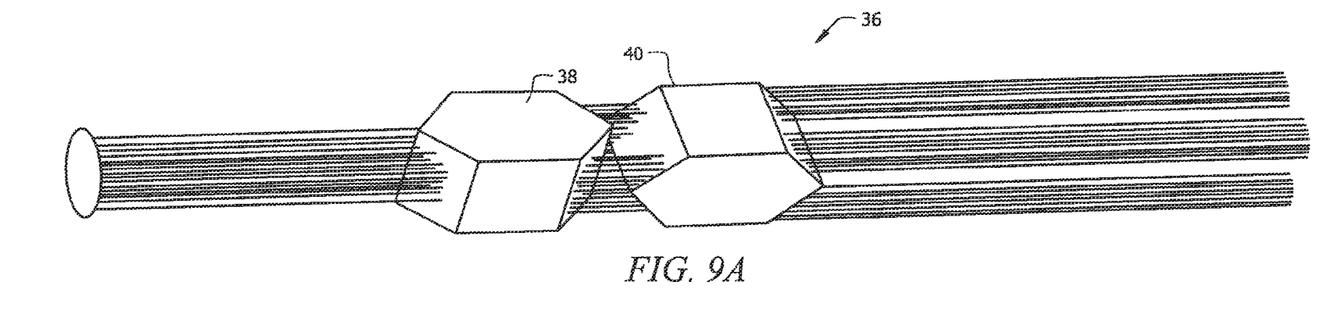
FIG. 9A is a perspective view of a dual dove prism arrangement for a two-axis Gaussian inversion.
Figure 9B:
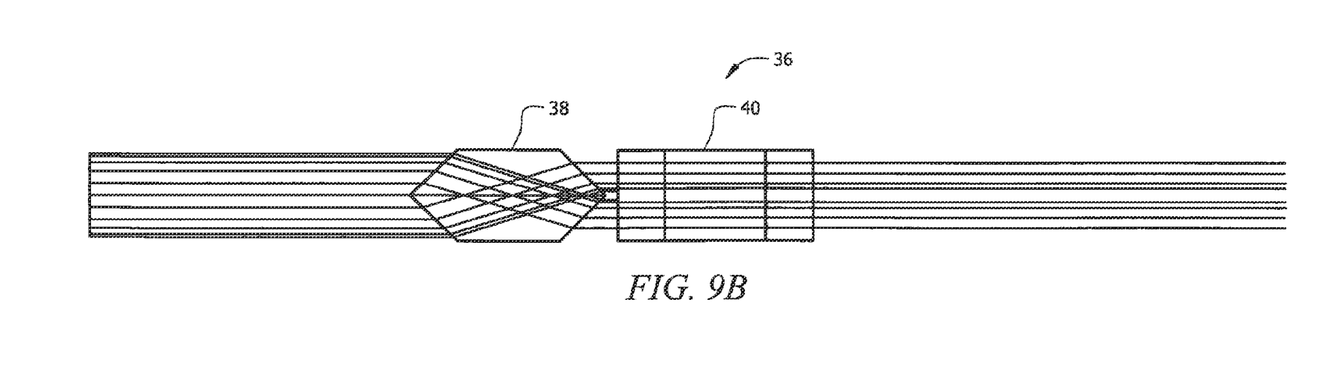
FIG. 9B is a side elevational view of the structure depicted in FIG. 9A.

Two sets of dove prisms arranged base-to-base and rotated ninety degrees (90°) from one pair to the other would be the equivalent of two cubes placed in a similar fashion as depicted in FIGS. 9A and 9B.

The grey scale intensity profile created by the apparatus of FIG. 7 is depicted in FIG. 3C.

Accordingly, glass cube 20 and dove prisms 26a, 26b, produce substantially the same grey scale intensity profile.

Figure 8:
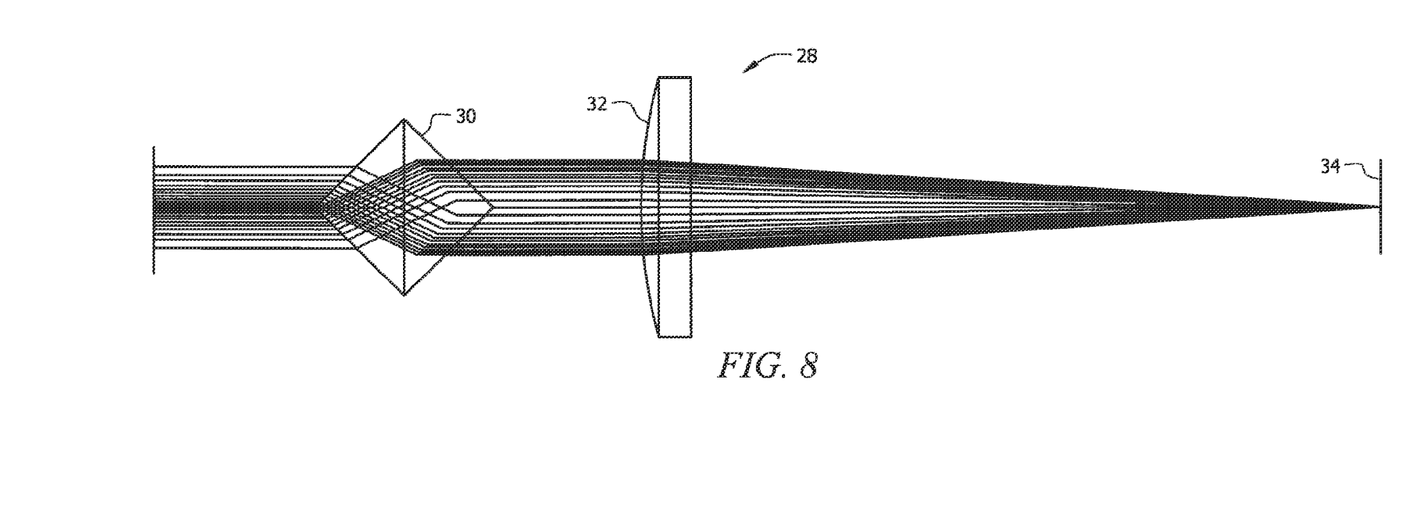
FIG. 8 depicts an octahedron Gaussian inverter system for thin film scribing.

FIG. 8 depicts an octahedron Gaussian inverter system, denoted 28 as a whole. It includes a laser having a Gaussian or Gaussian-like transverse shape that is directed onto refractive means 30 such as an octahedron as depicted in FIG. 8. However, a 4x4 element Keplerian telescope, dual cubes and dual dove prism combinations achieve the same result but require more elements. Focusing element 32 focuses the light onto thin film substrate 34.

FIGS. 9A and 9B provide perspective and side elevational views, respectively, of a dual dove prism arrangement for a 2 axis Gaussian inversion, denoted 36 as a whole. Item 38 is a dual dove prism and item 40 is a focusing element.

Figure 10A:
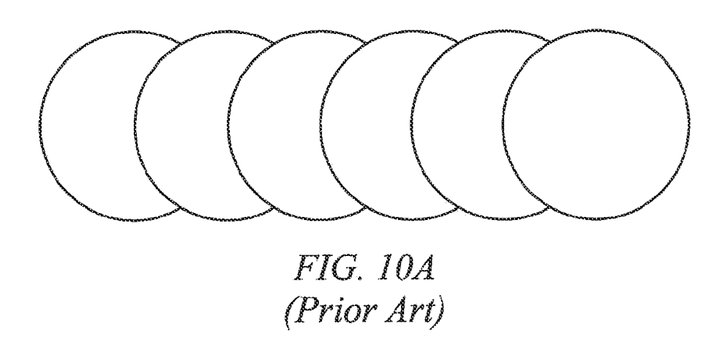
FIG. 10A is a prior art view of a round spot scribe having scalloped edges.
Figure 10B:
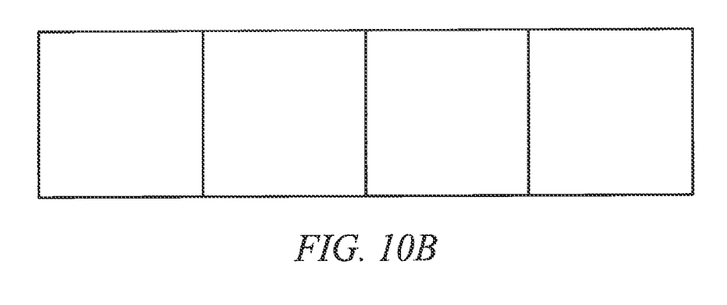
FIG. 10B depicts the efficient scribe of square shapes made possible by the inventive structure.

FIG. 10A depicts round spot scribes having scalloped edges and FIG. 10B depicts the more efficient square spot scribes made possible by the present invention.

The Gaussian inverter optic is not limited to thin film scribing. It could easily be used in applications where square, rectangular, or similar shapes need to be drilled in a material and could also aid straight line cutting applications. Adding a rotational means to the Gaussian inverter enables its steep edge profile to be used for scribing or cutting at angles or curves. The rotation of the Gaussian inverter can be synchronized with the linear travel of the stage or scanning of the laser beam to accommodate arcs and curves. Moreover, some welding applications could benefit from the inverted Gaussian profile to minimize key holing effects.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A thin-film scribing apparatus, comprising:
    a first pair of dove prisms having silvered bases disposed in a base-to-base abutting relation to one another;
    a second pair of dove prisms disposed in said base-to-base abutting relation to said first pair of dove prisms;
    said first pair of said dove prisms rotated ninety degrees (90°) with respect to said second pair of said dove prisms;
    said first and second pairs being equivalent to two cubes placed in said base-to-base abutting relation to one another where a first cube is rotated ninety degrees (90°) with respect to a second cube.

* * * * *